United States Patent [19]

Saito

[11] Patent Number: 4,939,607
[45] Date of Patent: Jul. 3, 1990

[54] HEAD CARRIAGE FOR USE WITH A LONGITUDINAL RECORDING SYSTEM UTILIZING A ROTARY RECORDING AND/OR REPRODUCING HEAD

[75] Inventor: Etsuro Saito, Kanagawa, Japan

[73] Assignee: Sony Corporation, Tokyo, Japan

[21] Appl. No.: 254,707

[22] Filed: Oct. 7, 1988

[30] Foreign Application Priority Data

Oct. 16, 1987 [JP] Japan .................. 62-261374

[51] Int. Cl.⁵ .................. G11B 5/52; G11B 21/12
[52] U.S. Cl. .................. 360/107; 360/70; 360/84
[58] Field of Search .................. 360/107, 84–85, 360/95, 77.12–77.13, 64, 70

[56] References Cited

U.S. PATENT DOCUMENTS

| | | | |
|---|---|---|---|
| 3,294,902 | 12/1966 | Maxey | 360/10.3 |
| 4,040,109 | 8/1977 | Kryltsov | 360/107 |
| 4,285,016 | 8/1981 | Gilovich | 360/84 |
| 4,318,146 | 3/1982 | Ike et al. | 360/107 |
| 4,321,634 | 3/1982 | Lehureau | 360/70 |
| 4,369,473 | 1/1983 | Eibensteiner | 360/85 |
| 4,482,928 | 11/1984 | Moriya et al. | 360/77.13 |
| 4,609,947 | 9/1986 | Yamagiwa et al. | 360/84 X |
| 4,819,099 | 4/1989 | Saito | 360/84 |
| 4,851,940 | 7/1989 | Saito | 360/107 X |
| 4,881,145 | 11/1989 | Hathaway | 360/130.24 |

*Primary Examiner*—John H. Wolff
*Attorney, Agent, or Firm*—Ronald P. Kananen

[57] ABSTRACT

This invention is directed to an improved longitudinal-type rotary head recording system. The improved assembly includes a transducing head carriage mechanism which may be easily accessed for quick and inexpensive replacement of the recording head assembly. In addition, improvements to the head drum assembly are disclosed wherein air gaps, which may form between the head assembly and recording tape are eliminated.

9 Claims, 7 Drawing Sheets

4,939,607

HEAD CARRIAGE FOR USE WITH A LONGITUDINAL RECORDING SYSTEM UTILIZING A ROTARY RECORDING AND/OR REPRODUCING HEAD

BACKGROUND OF THE INVENTION

1. Field of the Invention

This invention relates to an improved apparatus for recording and/or reproducing signals as longitudinal tracks which are formed on a recording medium, and more particularly to an apparatus for recording and/or reproducing signals as longitudinal tracks which are formed on a recording medium utilizing a rotary drum system incorporating rotary heads.

2. Description of the Prior Art

In the helical scan type video cassette recorder (VCR) of the prior art, the plane of movement of the recording tape and the plane of rotation of the rotating head are not parallel This is necessary in order to accomplish helical scanning whereby tracks are written on a recording tape on a bias To accomplish this helical scanning, a rotary head drum assembly containing the rotating recording heads is obliquely mounted on the chassis of a VCR Tape is then withdrawn from a cassette by a loading mechanism and is wrapped, obliquely, around the rotary drum Because of the nature of this tape wrapping operation, the tape is subject to stresses not only in its running direction, but also tension imposed on the tape at an oblique angle by the movement of the head drum assembly. To minimize this oblique tension, the head assembly and loading mechanism must be carefully manufactured using precisely machined parts, thereby increasing the cost of the completed unit. In addition, in such a helical scan system, highly accurate tape guides are necessary to insure proper coupling between the tape and the head drum. These helical loading systems are complex and thus result in high manufacturing costs, as well as decreased tape loading times.

To overcome these problems, longitudinal recording systems utilizing a rotary drum have been proposed. One such system is described in U.S. Pat. No. 4,040,109, issued on Aug. 2, 1977 to Kryltsov. Another such example is U.S. Pat. No. 4,819,099 which is assigned to the same assignee as the instant invention.

As shown in the Kryltsov drawings, a rotary drum assembly contains a slot through which magnetic heads are exposed. These magnetic heads travel upward and downward, thereby contacting the full width of the recording tape. However, as shown in Kryltsov, the slot provided in the rotary drum assembly allows an excessively large air gap to form between the heads and the tape. If this gap between the heads and the tape becomes too large and/or fluctuates, the signal recorded on the tape will not be satisfactory for either recording or playback functions.

SUMMARY OF THE INVENTION

Accordingly, it is an object of this invention to provide a recording and/or a reproducing apparatus utilizing a rotary head drum system which overcomes the above-described limitations.

An additional object of this invention is to provide a tape recording and/or reproducing apparatus utilizing a rotary head drum assembly in which tracks are formed longitudinally on the tape, in the direction of motion of the tape, obviating the need for a complex tape loading mechanism.

Another object of the invention is to provide a tape recording and/or reproducing apparatus utilizing a rotary head drum assembly in which tracks are formed longitudinally on the tape and in the direction of motion of the tape where oblique tape tension between the rotary head assembly and the tape is avoided.

A further object of the invention is to provide a tape recording and/or reproducing apparatus utilizing a rotary head drum assembly in which an air gap which may be formed between the head and the tape is controlled to insure accurate recording and reproduction.

Still other objects and advantages of the invention will in part be obvious and will in part be apparent from the specification.

The invention, accordingly, comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the invention, reference is made to the following descriptions taken in connection with the accompanying drawings, in which.

DETAILED DESCRIPTION OF THE PREFERRED EMBODIMENTS

As will be described in more detail, in accordance with one aspect of the present invention, a longitudinal scanning type VCR is provided The VCR incorporates a rotary head drum assembly which is rotatably mounted on the chassis. The rotary head drum assembly has at least one opening in its periphery and the transducing means is located within the opening. A tape loading and guiding assembly is utilized for guiding magnetic tape around the assembly in such a manner that the magnetic tape runs in a direction perpendicular to the rotating axis of the head drum A head carriage which carries the transducing means is located within the head drum assembly so that, as noted above, the transducing means protrudes through the opening in the rotary head drum assembly to couple with the magnetic tape In the present invention, the head carriage is designed to substantially cover all of the opening provided in the rotating drum assembly. Shifting means are also provided in the head drum assembly for shifting the head carriage and associated magnetic heads in a direction parallel to the axis of the rotary head drum.

Figure 5:
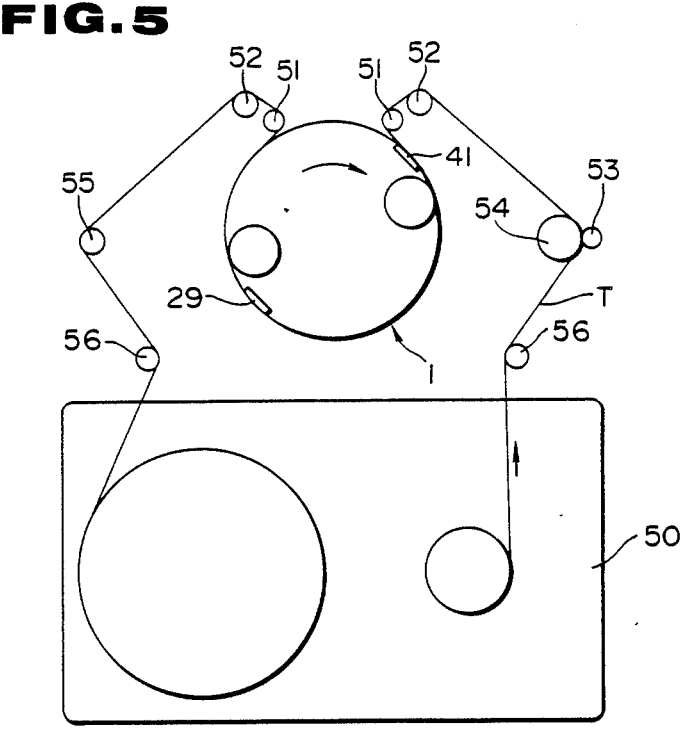
FIG. 5 is a diagrammatic illustration of a longitudinal recording and/or reproducing apparatus to which the rotary drum system of the present invention is applied.

Referring first to FIG. 5, a basic illustration of a video cassette recorder in which the present invention is applied, is shown After a video cassette 50 is positioned in the VCR, a tape T is loaded by two pairs of tape guides 51 and 52, which are driven by a loading mechanism (not shown) so as to wrap the tape T around a rotary drum assembly 1. Reference numbers 53, 54, 55 and 56 refer, respectively, to a capstan axis, a pinch roller, a tape guide which is movable with a tension arm (not shown), and guide rollers.

Figure 1:
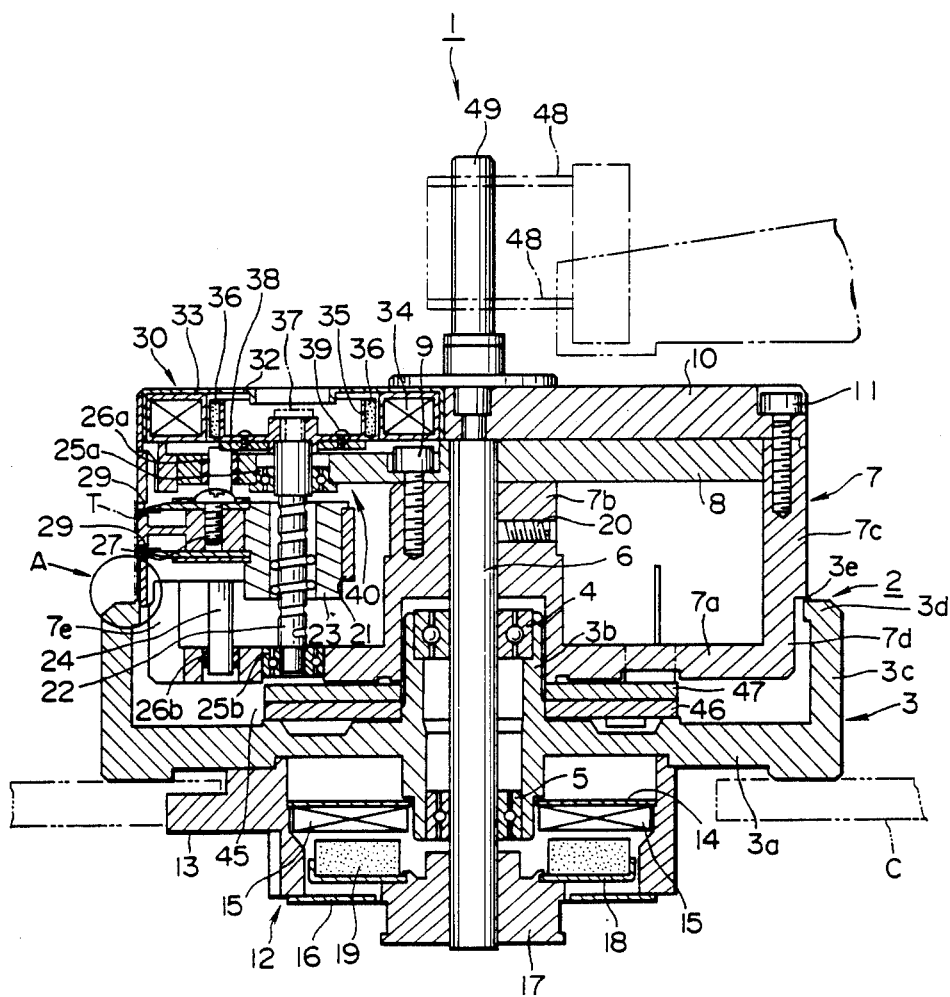
FIG. 1 is a cross-sectional illustration of a preferred embodiment of a rotary drum system according to the present invention taken along line B—B of FIG. 3.

Referring now to FIG. 1, the rotary drum assembly 1 is depicted in greater detail. As can be seen, a rotary head drum 2 of the rotary drum assembly 1 is mounted perpendicular to the chassis C in the longitudinal type VCR of the instant invention. Specifically, the rotary head drum 2 includes a fixed drum 3, which is vertically mounted to a chassis C, and a rotary drum 7 which is rotatably supported by an axle 6 inside the peripheral wall 3c of the fixed drum 3 During assembly, the axle 6 may be inserted into a bearing assembly 3b of the fixed drum 3 through a pair of bearings 4 and 5.

A disc-shaped flange 8 is mounted, and secured by a screw 9, on an upper surface of a cylindrical bearing member 7b, which member protrudes from the bottom portion 7a of the rotary drum 7. A disc-shaped lid 10 is then mounted on the upper surface of a peripheral portion 7c of the rotary drum 7 and secured by screws 11 so that the disc-shaped lid 10 covers the flange 8.

A brushless motor 12 is provided under the bottom portion 3a of the fixed drum 3 and serves to rotate the axle 6. The stator or a brushless motor 12 comprises a cylindrical yoke 13 which is affixed to the bottom portion 3a of the fixed drum 3; a ring-shaped stator yoke 14, which is located in a position parallel with the bottom portion 3a of the fixed drum 3, and which is positioned between the bearing part 3b of the fixed drum 3 and the inner surface of the cylindrical yoke 13; a ring-shaped stator coil 15, which is located under the stator yoke 14 and is phasematched with the stator yoke 14; and a stator cover 16, which covers the lower opening of the yoke 13.

Figure 4:
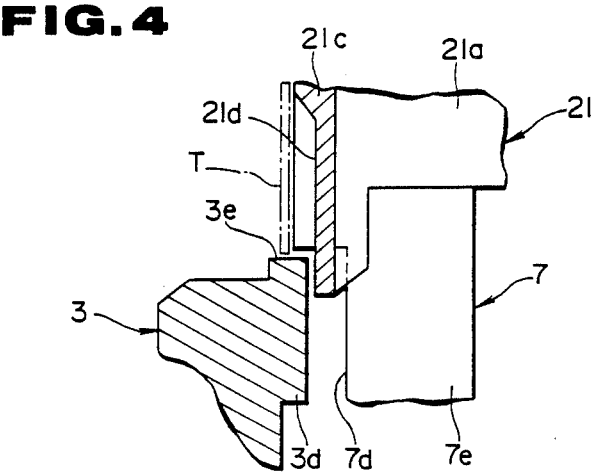
FIG. 4 is an enlarged view the portion of A shown in FIG. 1.

The rotor of the brushless motor 12 comprises a rotor base 17, affixed to the axle 6; a ring-shaped rotor yoke 18, which is affixed to the rotor 17 and which is oriented to face the stator yoke 14; and a ring-shaped rotor magnet 19, which is affixed to the rotor yoke 18, and which is oriented to face the stator coil 15, with the stator coil 15 positioned some finite distance from the rotor magnet 19. A screw 20 is used to secure the bearing portion 7b, of the rotary drum 7, to the axle 6 in order to avoid slippage therebetween. As a result of this construction, the rotational power of the brushless motor 12 may be completely transferred to the rotary drum 7 through the axle 6, Referring now to FIGS. 1 and 4, it can be seen that the lower side of the peripheral portion 7c defines two rectangular openings 7e which are positioned 180° relative to each other. The rectangular openings 7e are defined such that the longer sides are oriented vertically with respect to the chassis C. As can be seen in FIG. 4, the rotary drum 7 is configured to define a recessed portion 7d. In the space provided by, the recessed portion 7d, an inwardly protruding portion 3d of the rotary drum 3 is positioned so that the lower periphery of the rotary drum 7 is rotatably supported inside the peripheral wall 3c of the fixed drum 3. In this way, the upper surface 3e of the inwardly protruding portion 3d additionally serves to guide the lower end of a tape T as it runs around the peripheral portion 7c of the rotary drum 7.

Figure 2:
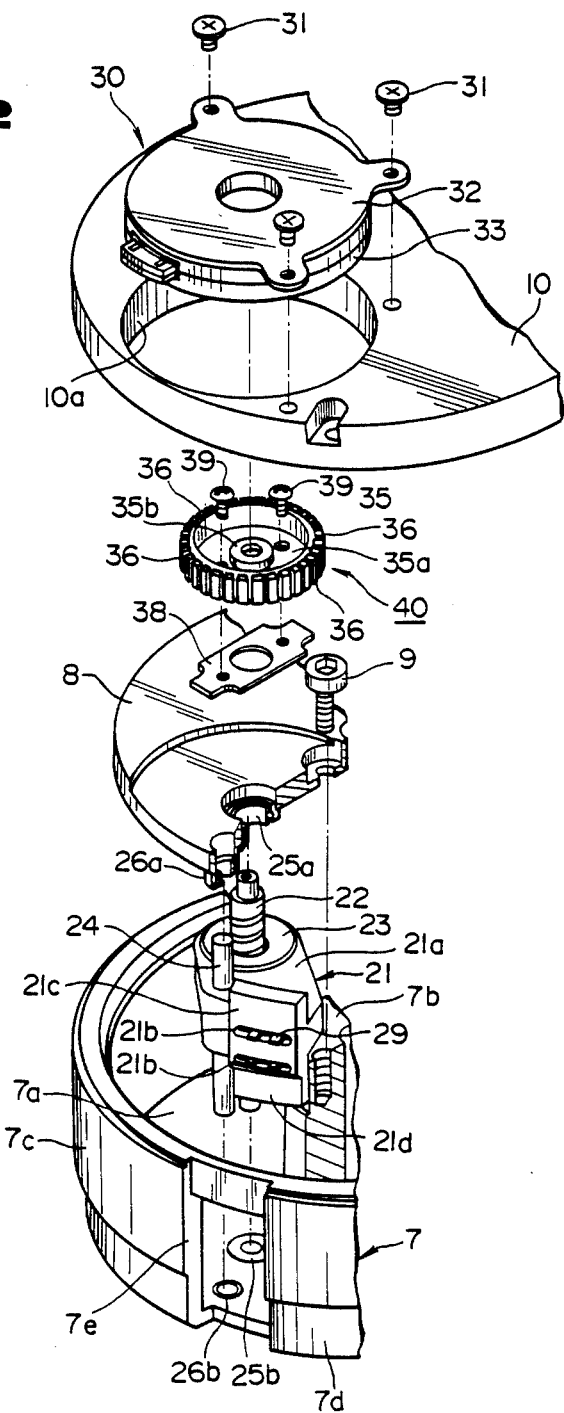
FIG. 2 illustrates a partial perspective view of the rotary drum system 1 drawn to an enlarged scale.

Referring now to FIG. 2, a carriage 21, on which transducing heads may be mounted, is illustrated. The carriage is positioned adjacent to one rectangular opening 7e of the rotary drum 7. The carriage 21 is movable vertically along a path defined by the operation of a threaded screw 22 in order to permit movement of the transducer elements As shown, the carriage 21 comprises a horizontal portion 21a, into one end of which a bearing portion 23 is inserted, and a vertical portion 21c, which is integral with the other end of the horizontal portion 21a. The bearing portion 23 engages the threaded screw 22. The vertical portion 21c defines a pair of windows 21b, through which the recording heads 29 may protrude. The horizontal portion 21a is directed by guide member 24 so that the vertical portion 21c is positioned and moves parallel to the threaded screw 22 As illustrated, both the upper and lower portions of the threaded screw 22 are rotatably supported by bearings 25a and 25b, which bearings are inserted into the flange 8 and the bottom portion 7a of the rotary drum 7, respectively. The upper portion of the guide member 24 is slidably supported by bushings 26a and 26b of the flange 8. The lower portion of the guide member 24 is slidably supported by the bottom portion 7a of the rotary drum 7.

Figure 3:
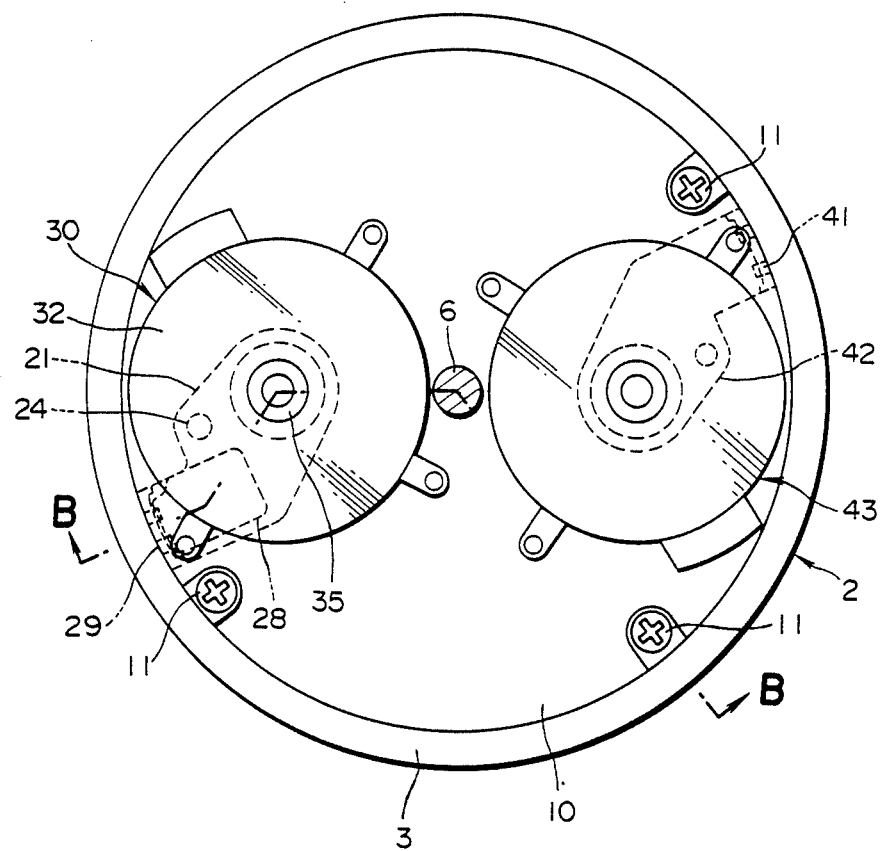
FIG. 3 is a top plan view of the rotary drum system of FIG. 1.
Figure 6:
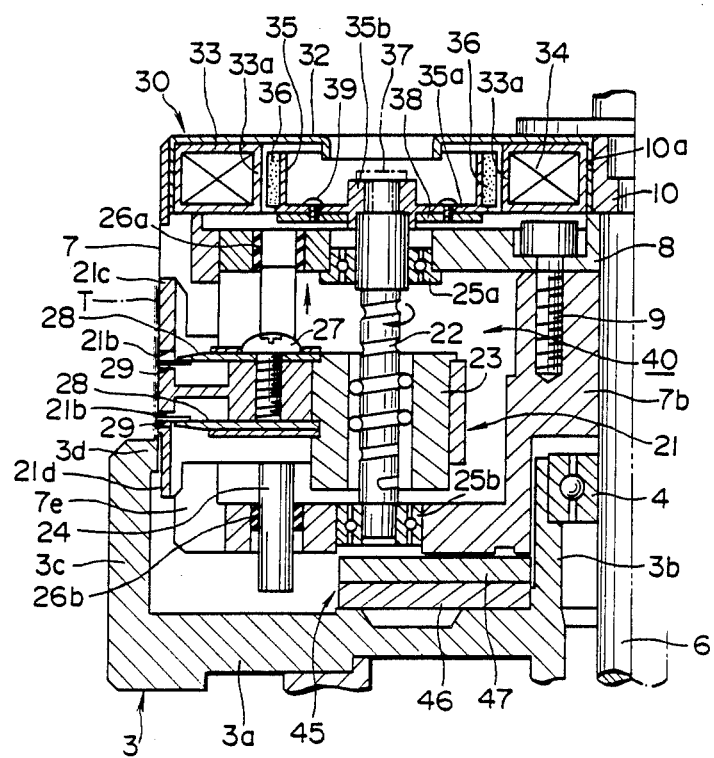
FIG. 6 is an enlarged cross-sectional view of a part of the rotary head system as shown in FIG. 1.

Referring further to FIGS. 3 and 6, the recording heads 29 are shown mounted on a pair of bases 28. These bases are affixed to the upper and lower surfaces of the horizontal portion 21a of carriage 21 by, screw a 27. The recording heads 29 are positioned with respect to the windows 21b on the vertical portion 21c of the carriage 21, so that the operational ends of the recording heads 29 protrude slightly from the outer surface of the vertical portion 21c in order to make contact with a magnetic medium. The upper end of the threaded screw 2 is connected to a PM (pulse motor) type stepping motor 30 which is mounted in a cavity 10a defined in the lid 10. The stator of the stepping motor 30 comprises a stator cover 32, affixed to the lid 10 by a screw 31, and a ring-shaped stator yoke 33, around which a coil 34 is wound. A plurality of poles 33a are arranged along the inside of the stator yoke 33.

As shown in FIGS. 2 and 6, the rotor of the stepping motor 30 comprises a rotor yoke 35 which is rotatably supported in the stator yoke 33, and a plurality of rotor magnets 36, which are arranged intermittently along the outer surface of the rotor yoke 35 to spacedly correspond to the poles 33a of stator yoke 33. The upper end of the threaded screw 22 is inserted into a boss 35b, which protrudes from the center of the bottom portion 35a of the rotor yoke 35. The upper end of threaded screw 22 and the boss 35b are both fixed into position by a screw 37. A stopper 38 is affixed to the lower surface of the bottom portion 35a of the rotor 35 by screws 39 Stopper 38 is used to limit the upward movement of guiding axis 24 and, hence, carriage 21. The stepping motor 30, together with the threaded screw 22, make up a shifting mechanism 40 This mechanism is used for shifting the recording heads 29 up and down along the width of the tape T. This shifting mechanism is designed to allow the recording heads 29 to move across an area which is at least as wide as the recording area of the tape T.

As shown in FIG. 4, the outer surface of the vertical portion 21c of the carriage 21 is shaped to coincide with the cylindrical shape of the rotary drum 7 and, in particular, to coincide with the outer surface dimensions of the peripheral portion 7c of the rotary drum 7. In addition, the carriage 21 defines a stepped recess 21d so that the carriage 21 can move downwardly adjacent to the inwardly protruding portion 3d of the fixed drum 3.

As can be seen in FIG. 3, a second carriage 42 and a second stepping motor mechanism 43 may be provided for operating, the playback heads 41 through an opening 7e. The movement and operation of the playback head carriage 42 is identical to the operation of the recording head carriage 21 and, thus, further details of the same will be omitted here.

Figure 7:
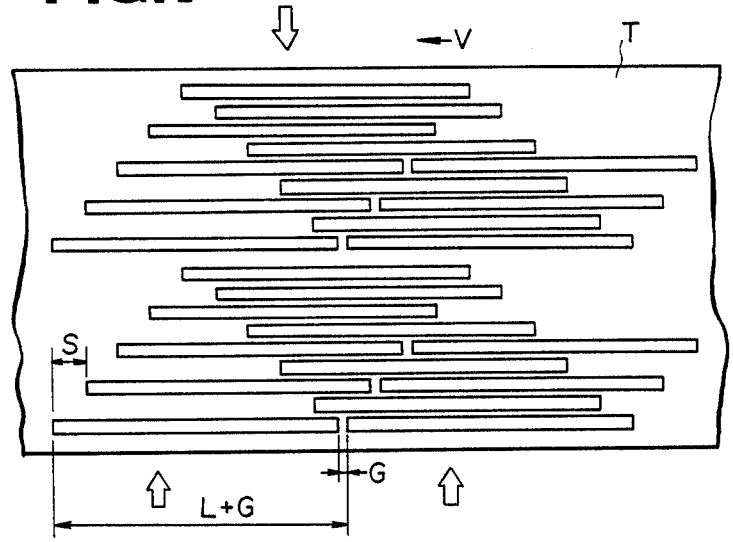
FIG. 7 is an illustration showing one example of a longitudinal recording track pattern to be formed on a magnetic tape by the rotary drum system of the present invention.

Reviewing FIGS. 1 and 6, a rotary transformer 45 is shown provided between the bottom portion 3a of the fixed drum 3 and the bottom portion 7a of the rotary drum 7. This transformer is used to the supply a recording signal to recording heads 29 and/or to receive a reproduced signal from the playback heads 41. The rotary transformer 45 comprises a rotary transformer stator 46 which is fixed to the bottom portion 3a, and a rotary transformer rotor 47 which is fixed to the bottom portion 7a. A slip ring 49 is connected to the upper end of the axle 6 to supply electric power to the recording heads 29 and/or, the playback heads 41 through a series of power supply brushes Referring now to FIG. 7, a typical longitudinal track pattern is illustrated. This pattern is shown by way of example, and may be scanned by the recording heads 29 in accordance with the operation of the present invention. During operation, the lower level track 1 is formed by the operation of the recording heads 29, which are oriented in a direction parallel to the longitudinal movement direction of the tape T. The track 1 is formed during a 270° rotation of the rotary drum 7. After the track 1 is recorded, the threaded screw 22 is driven by the stepping motor 30, as shown by the arrow in FIG. 6, so that the carriage 22 with the recording heads 29 is raised a single step, a distance, for example, of 0.133 mm. This occurs during the final 90° rotation of the drum 7. At this point, the track 2 may be written by recording heads 29. Since the tape T is moving to the left, with reference to FIG. 7, the start of the track 2 is located a distance S to the right of the start of track 1. As can be seen, this process continues for the entire width of the tape T. When the recording heads 29 reach the upper end of the tape T, after a series of tracks have been recorded starting with the track 1, the upper end of the guide member 24, which is attached to the carriage 21, the contacts stopper 38 of the rotor yoke 35, preventing any further upward movement of the recording heads 29.

After this uppermost track is formed, stepping motor 30 starts to rotate in a reverse direction, so that the carriage 21 with the recording head 29 moves downward to create an offset of a half step (for example 0.0666 mm). This is done so that new tracks written during the downward movement of the head 29 will be formed between already written tracks Following this downward offset shifting of the carriage 21 a half step, further downward shifting of the carriage 21 occurs in increases of one whole step.

Based on this construction, it can be calculated that when the rotations per minute (RPM) of the rotary drum 7 is R, the total number of tracks written by the recording head 29 per one cycle is N and the longitudinal distance between tracks is G, tape velocity V may be expressed as follows:

$$V = R(L+G)/N$$

In order to correct minor tracking errors, when the playback heads 41 reproduce signals from the tracks, a tracking control circuit may be added and used, in addition to the above sequential shifting, to accurately track the reproduced signal.

Figure 8:
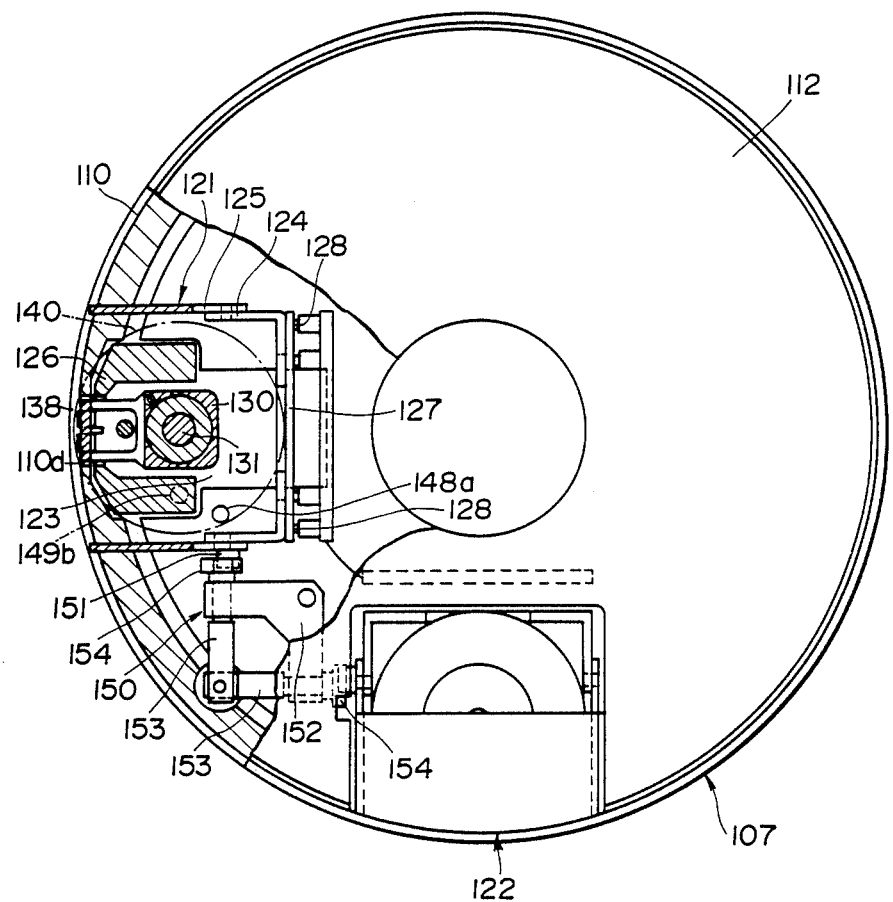
FIG. 8 illustrates a partial cut-away view of an alternate embodiment of a rotary drum system according to the present invention.
Figure 9:
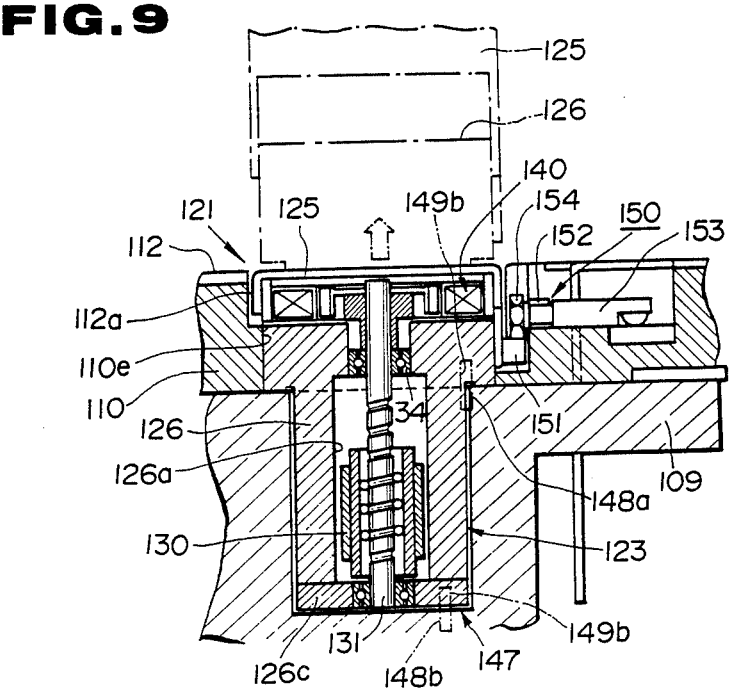
FIG. 9 is a cross-sectional view of a portion of the rotary drum system shown in FIG. 8.
Figure 10:
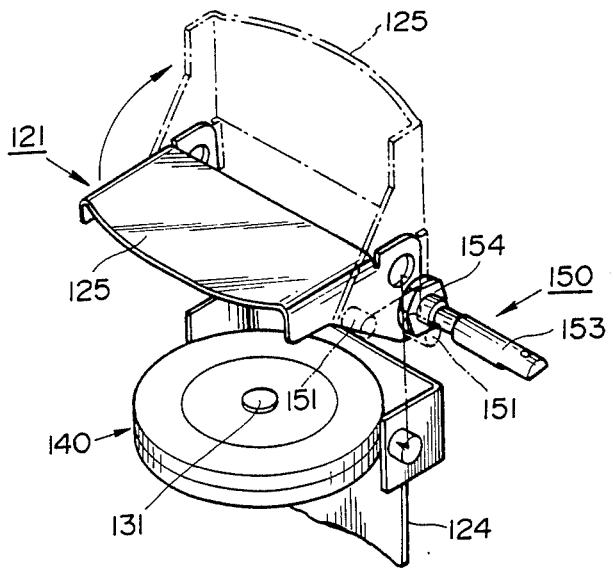
FIG. 10 is a partial plan view of the rotary drum system of FIG. 8 illustrating the operation of head replacement

Referring now to FIGS. 8 through 10, a second embodiment of the present invention will be described. As in the initial embodiment, a rotary drum 107 is provided with a pair of rectangular openings 110d to allow tape access to the recording heads and playback heads. Rectangular openings 110d, a first unit 121 for recording heads and a second unit 122 for playback heads, are all a part of a cavity 123. However, as shown in FIG. 8, unlike the earlier embodiment, the recording head unit 121 and the playback head unit 122 are mounted 90° apart from each other and not 180° apart. In addition, each cavity 123 is provided with a flange 109 and a space which is provided in the rotary drum 107. Both units 121 and (22 are attachable and detachable in the cavity 123.

As illustrated in FIG. 10, the first head shield unit 121 includes a back plate 124 and a cover plate 125. The cover plate 125 may be moved into either one of two positions with respect to the back plate 124; a first open position and a second closed position. Referring to FIG. 9, a head assembly support block 126 is shown The configuration of the block 126 defines a cavity 126a and a carriage 130 is located within this cavity. The position of the carriage 130 may be shifted by the rotation of a screw 131 The head unit 121 additionally comprises a back wall support board 127 and a back plate 124 which is affixed to said support wall 127.

As noted above, a first head unit is defined to include the head carriage 130 and a head carriage shifting mechanism 146 As can be seen in FIG. 9, this head unit is located in a cavity designated 123. The head unit is moved by means of a positioning mechanism 147. The positioning mechanism 147 includes a pair of locking pins 148a and 148b, which are secured to the flange 109, and which engage the pinholes 149a and 149b provided in the mounting block 126. When the head access cover plate 125 is in a closed position (as indicated by the solid line drawing in FIG. 10), the head unit 121 is moved into an operating position by use of a pushing means 150. As can be seen clearly in FIGS. 8 and 10, this pushing means includes a pushing bar 153, which is biased in a downward position through the use of a leaf spring 152. The pushing bar 153 communicates with the cover plate 125 through a nut 154, which engages a stopper pin 151 affixed to the cover plate 125. When the cover plate 125 is in its closed position, the nut 154 touches the stopper pin 151.

Utilizing this structure, head replacement becomes easy. When replacement of the heads is required, the cover plate 125 is opened. This, in turn, rotates the pushing bar 153 so that the entire head unit 121 is raised and may be lifted out for replacement A new head unit 121 may then be placed into the cavity 123. The positioning of the new head unit may be accomplished once again, by closing the cover plate 125.

Therefore, applying the instant invention as described above, tape is transported around a rotary recording and playback drum in a direction perpendicular to the axis of the rotary drum. The tape loading mechanism necessary for this embodiment may be made in a simple manner without the need for any obliquely positioned tape guide. Because of this lack of oblique tape guide members or any oblique forces upon the tape, the tape will remain free from damage or stretching caused by tape tension. This is an advantage which may not be found in a helical scan VCR. In addition, since the head carriage incorporates vertical members having slots through which the heads protrude to make contact with the tape, and the surface of this vertical window may be adjusted to match the position of the head in accordance with the outer surface of the rotary drum, an air gap cushion between the heads and the tape may be maintained. In this way, contact between the heads and the tape remains ideal. In addition, since the lower edge of the tape is guided by the tape guiding member 3e provided on the fixed drum 3, the vertical positioning of the tape with respect to the rotary drum can be made more precise for greater recording and reproduction accuracy.

Finally, since the design of the instant invention allows for the easy and simple replacement of recording heads, the need for expensive servicing is reduced.

Although the preferred embodiments illustrated utilize a video cassette recorder, the invention is not limited and may be utilized with other rotary head recording systems.

It will thus be seen that the objectives set forth above, among those made apparent from the preceding description, are efficiently attained. In addition, since certain changes may be made in the above construction without departing from the spirit and scope of the invention, it is intended that all matter contained in the above description, or shown in the accompanying drawings, shall be interpreted as illustrative and not interpreted in a limiting sense.

It is also be to understood that the following claims are intended to cover all of the generic and specific features of the invention herein described and all statements of the scope of the invention shall, as a matter of language, be said to fall therebetween.

What is claimed is:

1. A longitudinal scanning system for a tape recording and/or reproducing apparatus comprising:
   a rotary drum rotatably mounted on a chassis and having at least one opening in the periphery thereof;
   tape guiding means for guiding a tape medium around said rotary drum;
   tape transporting means for transporting said tape medium perpendicular to a rotating axis of said rotary drum;
   head carriage means for carrying a head which contacts said tape medium through said opening of said rotary drum, said head carriage means having a surface which is proximal to said periphery of said rotary drum ground said opening; and
   shifting means for shifting said head carriage means, within said opening of said rotary drum, in the direction of said rotating axis.

2. A longitudinal scanning system for a tape recording and/or reproducing apparatus according to claim 1, wherein
   said shifting means is operative in synchronism with rotation of said rotary drum.

3. A longitudinal scanning system for a tape recording and/or reproducing apparatus according to claim 2, wherein
   said shifting means is operative upon a complete rotation of said rotary drum.

4. A longitudinal scanning system for a tape recording and/or reproducing apparatus according to claim 1, further comprising:
   a fixed drum located under said rotary drum, said fixed drum having a guiding portion for guiding an edge of said tape medium.

5. A longitudinal scanning system for a tape recording and/or reproducing apparatus according to claim 1, wherein
   said surface of said head carriage means has the same radius of curvature as said periphery of said rotary drum.

6. A longitudinal scanning system for a tape recording and/or reproducing apparatus according to claim 1, wherein
   said head carriage means further comprises means for substantially covering said opening of said rotary drum.

7. A longitudinal scanning system for a tape recording and/or reproducing apparatus according to claim 6, wherein
   said means for substantially covering said opening comprises a vertical member which extends in the direction of said rotating axis.

8. A longitudinal scanning system for a tape recording and/or reproducing apparatus according to claim 7, wherein
   said vertical member contains an opening in a surface thereof, such that said head protrudes through said opening to contact said tape medium.

9. A longitudinal scanning system for a tape recording and/or reproducing apparatus according to claim 1, wherein
   said head carriage means and said shifting means are formed as a single unit, and wherein said rotary drum contains a space for receiving said single unit.

* * * * *